June 9, 1931.  F. H. OWENS  1,809,310
METHOD AND MEANS FOR REPRODUCING PHOTOGRAPHIC SOUND RECORDS
Filed March 8, 1929
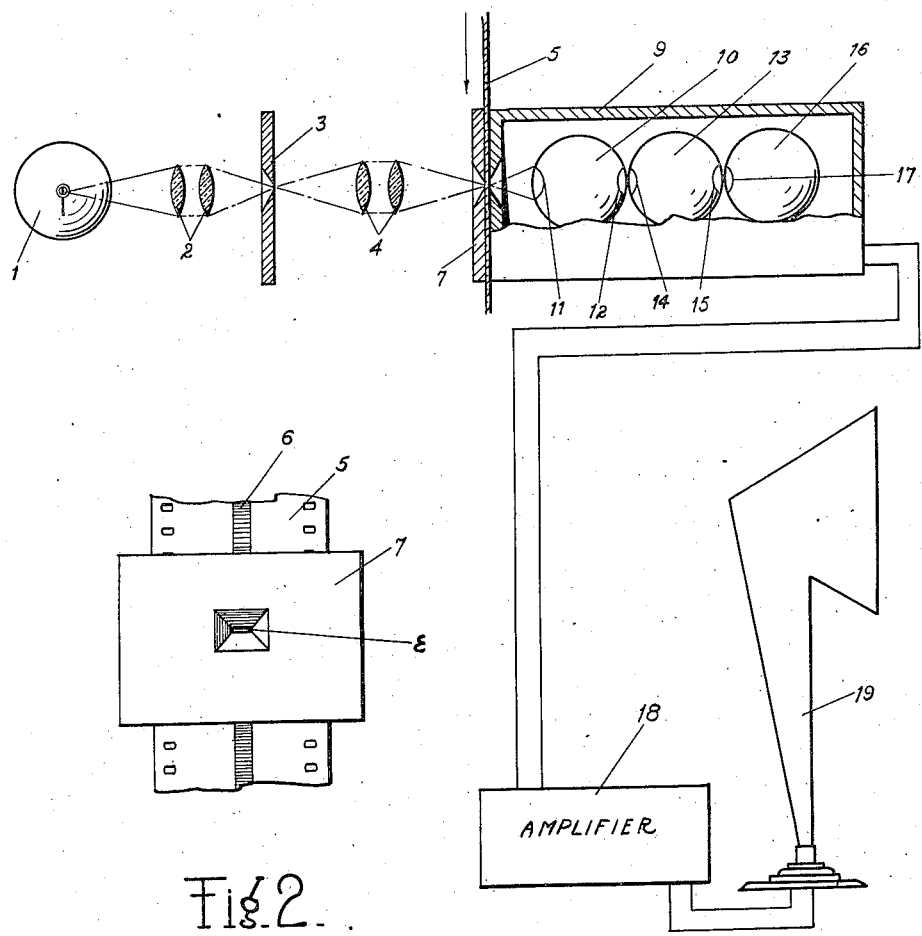
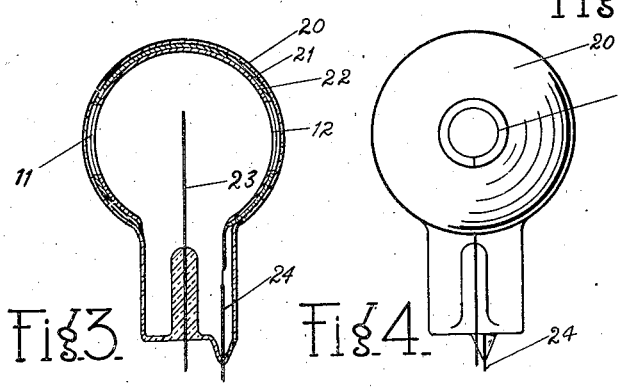
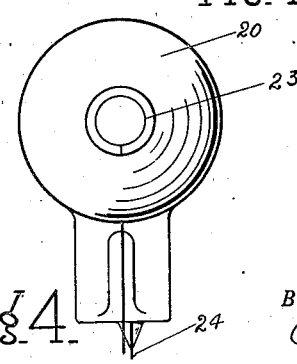
INVENTOR.
FREEMAN H. OWENS.
BY
ATTORNEY Patented June 9, 1931

1,809,310

UNITED STATES PATENT OFFICE

FREEMAN H. OWENS, OF NEW YORK, N. Y., ASSIGNOR TO OWENS DEVELOPMENT CORPORATION, OF NEW YORK, N. Y.

METHOD AND MEANS FOR REPRODUCING PHOTOGRAPHIC SOUND RECORDS

Application filed March 8, 1929. Serial No. 345,577.

My invention relates to a means and method of reproducing photographic sound records and has for its primary object the provision of a plurality of photoelectric cells used in one of the steps of the reproducing process, and of a specially constructed photoelectric cell particularly adapted for such reproduction.

Heretofore in the reproduction of photographic sound records, it has been the practice to use a single photoelectric cell as a control "valve" for an electric circuit, modulated by the sound record. I have found that by the use of a plurality of photoelectric cells, all of which are affected by the modulated light waves reaching them from the film and slit past which the film moves, the volume of the reproduced sound is greatly increased with the same degree of amplification.

I have further provided a specially constructed photoelectric cell adapted particularly for use in such multiple units, as is more fully explained as the description proceeds, reference now being had to the figures of the accompanying drawings, forming a part of this application and wherein like reference numerals indicate like parts.

In the drawings:—

Figure 1 is a partially diagrammatic and partially sectional view of a photographic sound record reproducing apparatus arranged in accordance with my invention.

Figure 2 is a detail front view of the film gate through which the film bearing the sound record passes.

Figure 3 is a detail sectional view illustrating the construction of my new photoelectric cell.

Figure 4 is a detail front view of the cell.

With reference now to Figure 1, the reference character 1 indicates a source of light, preferably an electric lamp of constant intensity, the rays from which pass through condenser lenses 2, from which they pass through a slit 3, the illuminated areal image of which slit is focused by means of the lens unit 4 upon the film 5 bearing the sound record 6, as it passes through the film gate 7 provided with the narrow opening 8 in alignment with the sound record 6.

The light passing through the film sound record 6 is obviously modulated by such sound record and the modulated rays pass into a casing 9 and to a photoelectric cell 10 provided with a window 11. This photoelectric cell 10 is also provided with a second window 12 through which the rays of light may pass out of the cell 10 and to a second photoelectric cell 13, also provided with a plurality of windows 14 and 15. Obviously as many photoelectric cells provided with a plurality of windows to permit the light rays to pass from one to the other may be provided as desired or found practical. In this instance and as illustrative only, three such photoelectric cells have been shown, the third cell being indicated at 16 and provided with a single window 17 to receive the light rays passing through the cell 13.

The output of each of the cells 10, 13 and 16 may be connected in any suitable manner to a proper amplifier 18 of desirable construction and "hookup" and such amplifier being in turn having suitable connection with a loud speaker device 19, whereby the sound record 6 of the film 5 is rendered audible. Obviously, the film 5 may be moved past the opening 8 in the film gate and in the front of the casing 9 by any suitable film moving device.

Reference to Figures 3 and 4 illustrates the detailed construction of my improved photoelectric cells, the same consisting of an air evacuated glass casing 20, the interior of which is silvered in the usual manner as at 21, and then coated with a light sensitive substance 22. The silver and light sensitive coatings cover the interior of the glass casing except for the multiplicity of windows, shown in Figures 1 and 3 as two in number and indicated at 11 and 12. One electrode consisting of the looped wire 23 extends upwardly into the tube and the other electrode 24 is secured between the silver and light sensitive coatings.

It will be understood that the number and particular arrangement of the windows in the photoelectric cell may be varied to suit conditions and circumstances. I, therefore, do not wish to be limited to the form shown in this case.

Inasmuch as the action of a photoelectric cell is well known and forms no part of this invention, it is deemed unnecessary to include here a detailed description thereof. Suffice it to say that when light is admitted through the window to the light sensitive coating inside the cell, it causes such material to give off electrons and establish across the electrodes 23 and 24 a weak electric current variable exactly as the variations in the light striking the same. This variable current is then utilized to modulate a stronger current, which upon proper amplification may be rendered audible by means of a loud speaker, thereby converting the photographed sound waves on the film to an audible reproduction thereof.

Of course, changes may be made in details of construction and arrangement of parts without departing from the spirit and scope of my invention. I do not limit myself, therefore, to the exact form herein shown and described other than by the appended claims.

1. The method of reproducing a photographic sound record comprising the steps of modulating light rays by said record, passing said modulated light rays through a plurality of aligned photoelectric cells, modulating an electric current by the output of all of said cells and conducting said modulated current to an amplifier and loud speaker.

2. In combination, a light source, a slit through which rays of light from said source pass, a photographic sound record movable with respect to said slit to receive said rays, a plurality of photoelectric cells in position to receive the light rays passing through and modulated by said record, certain of said cells having a plurality of windows to permit the modulated light rays to pass from one cell to another, and said photoelectric cells having operative connection with an amplifier and loud speaker.

3. In combination, a light source, a slit through which rays of light from said source pass, a photographic sound record movable with respect to said slit to receive said rays, a plurality of aligned photoelectric cells in position to receive the light rays passing through and modulated by said record, said cells having a plurality of windows to permit the modulated light rays to pass from one cell to the next, and said photoelectric cells having operative connection with a single amplifier and loud speaker.

In testimony whereof, I affix my signature.

FREEMAN H. OWENS.